(12) United States Patent
Matlow

(10) Patent No.: US 10,471,780 B2
(45) Date of Patent: Nov. 12, 2019

(54) COMPREHENSIVE TIRE PRESSURE MAINTENANCE SYSTEM

(71) Applicant: Mell Matlow, New Jersey, NJ (US)

(72) Inventor: Mell Matlow, New Jersey, NJ (US)

( * ) Notice: Subject to any disclaimer, the term of this patent is extended or adjusted under 35 U.S.C. 154(b) by 345 days.

(21) Appl. No.: 14/889,864

(22) PCT Filed: May 9, 2014

(86) PCT No.: PCT/US2014/037413
§ 371 (c)(1),
(2) Date: Nov. 9, 2015

(87) PCT Pub. No.: WO2014/182979
PCT Pub. Date: Nov. 13, 2014

(65) Prior Publication Data
US 2016/0082788 A1    Mar. 24, 2016

Related U.S. Application Data

(60) Provisional application No. 61/821,532, filed on May 9, 2013.

(51) Int. Cl.
| | | |
|---|---|---|
| *B60C 23/00* | (2006.01) | |
| *B60C 17/02* | (2006.01) | |
| *B60C 23/04* | (2006.01) | |
| *B60C 23/10* | (2006.01) | |
| *G01M 17/02* | (2006.01) | |
| *H01M 2/02* | (2006.01) | |

(52) U.S. Cl.
CPC ............ *B60C 17/02* (2013.01); *B60C 23/001* (2013.01); *B60C 23/0401* (2013.01); *B60C 23/0406* (2013.01); *B60C 23/0447* (2013.01); *B60C 23/0494* (2013.01); *B60C 23/0496* (2013.01); *B60C 23/10* (2013.01); *G01M 17/02* (2013.01); *H01M 2/022* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 4,289,187 A | 9/1981 | Rivlin | |
| 4,742,857 A | 5/1988 | Gandhi | |
| 5,452,753 A | 9/1995 | Olney | |
| 5,467,083 A * | 11/1995 | McDonald | ............ E21B 47/122 340/854.4 |
| 5,853,020 A * | 12/1998 | Widner | ................. B60C 23/004 137/227 |

(Continued)

FOREIGN PATENT DOCUMENTS

| | | |
|---|---|---|
| DE | 19713021 A1 | 10/1998 |
| EP | 1988-04-13 A2 | 4/1988 |
| JP | 2008143344 A | 6/2008 |

*Primary Examiner* — Adolf Dsouza
(74) *Attorney, Agent, or Firm* — Mark M. Friedman

(57) ABSTRACT

A comprehensive tire pressure maintenance system for use with motor vehicles that includes a TPMS with an externally mounted battery, tubular battery configured for deployment on a valve stem configured to accommodate deployment of the tubular battery, a self-inflating pressure-optimizing tire arrangement, and a self-inflating run-flat tire arrangement and a wireless tire pressure gauge.

2 Claims, 6 Drawing Sheets

(56) References Cited

U.S. PATENT DOCUMENTS

| | | | |
|---|---|---|---|
| 2003/0113614 A1* | 6/2003 | Romero | H01M 2/1235 |
| | | | 429/61 |
| 2004/0055371 A1 | 3/2004 | Sanchez et al. | |
| 2005/0040941 A1 | 2/2005 | Schofield et al. | |
| 2006/0055522 A1 | 3/2006 | Rimkus et al. | |
| 2008/0055055 A1 | 3/2008 | Murakami | |
| 2011/0146868 A1* | 6/2011 | Losey | B60C 23/12 |
| | | | 152/426 |
| 2012/0218095 A1* | 8/2012 | Zhou | B60C 29/064 |
| | | | 340/447 |

\* cited by examiner

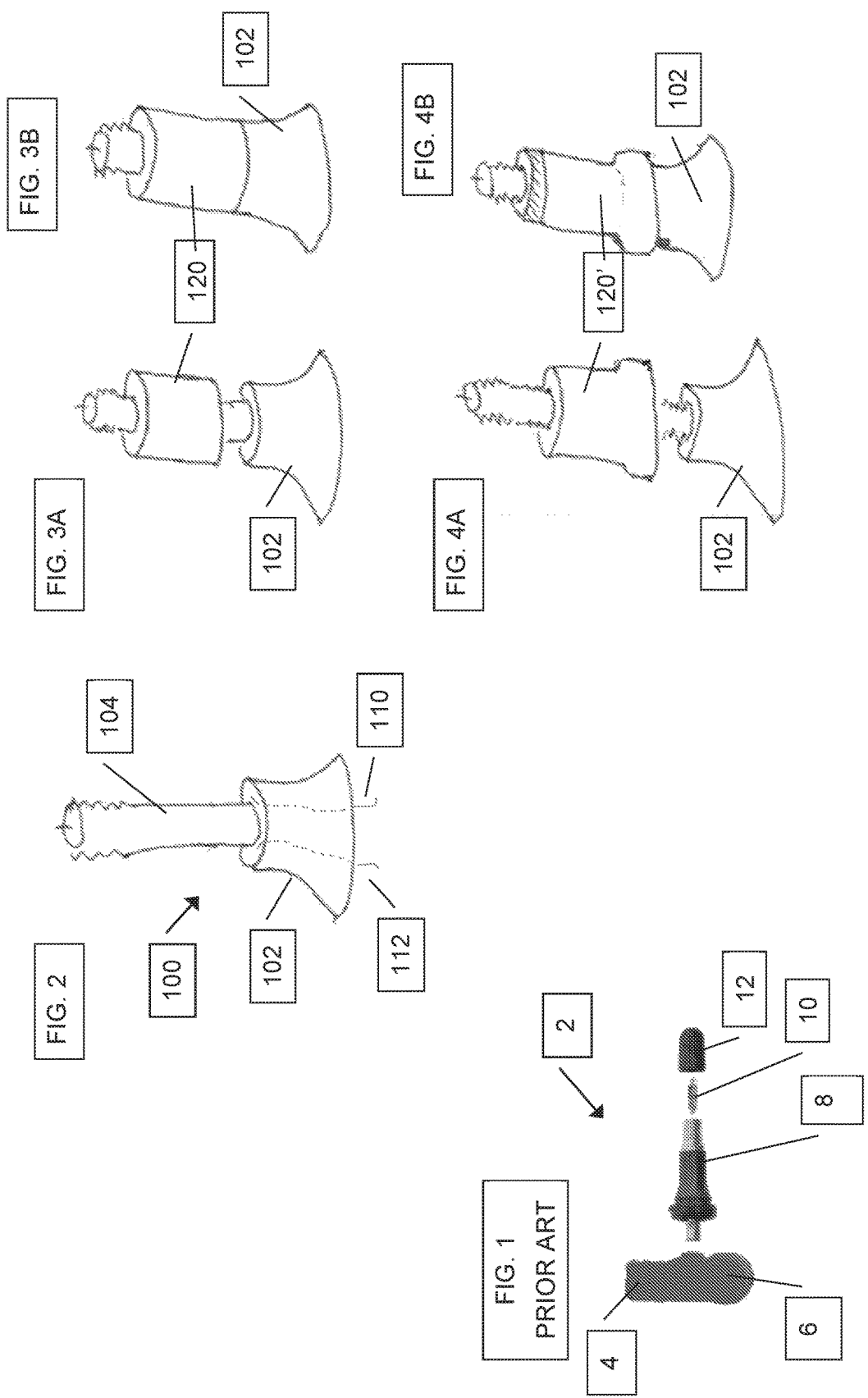

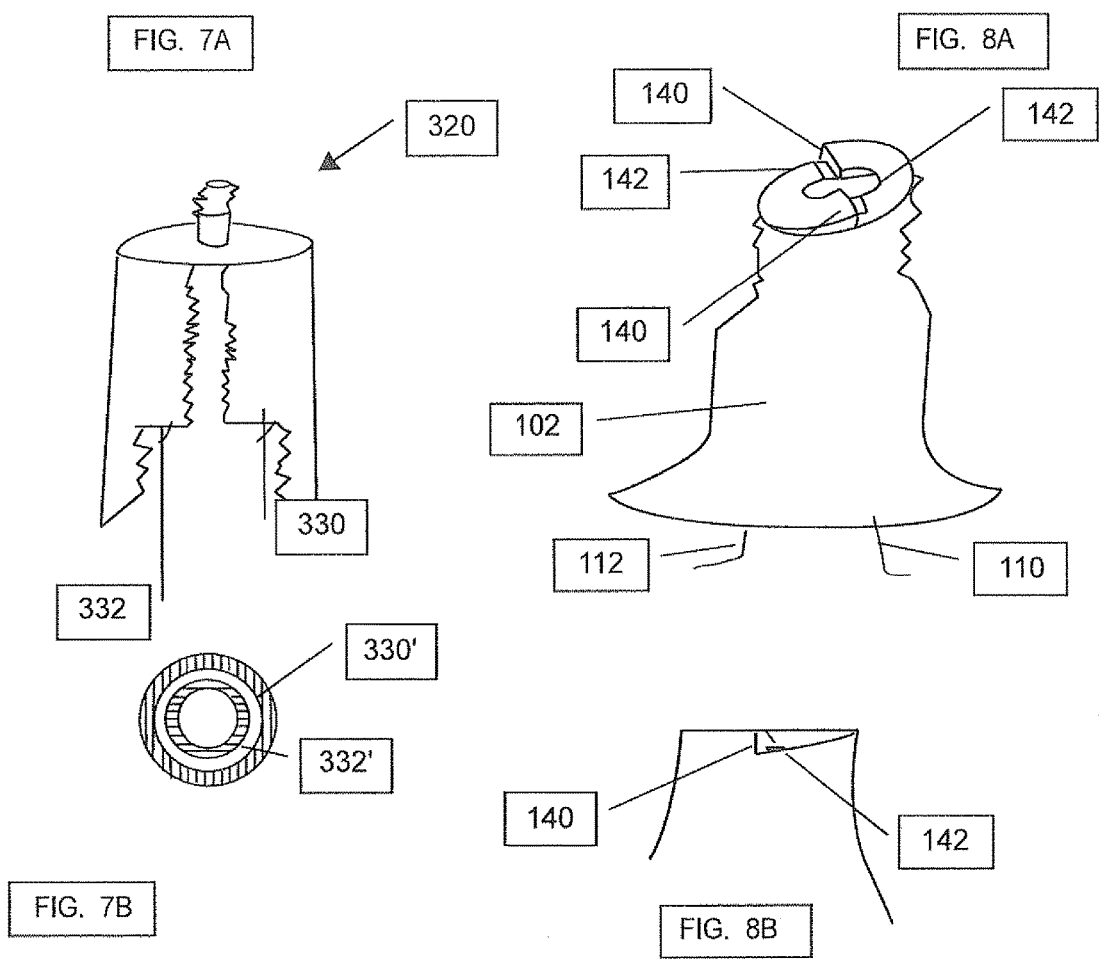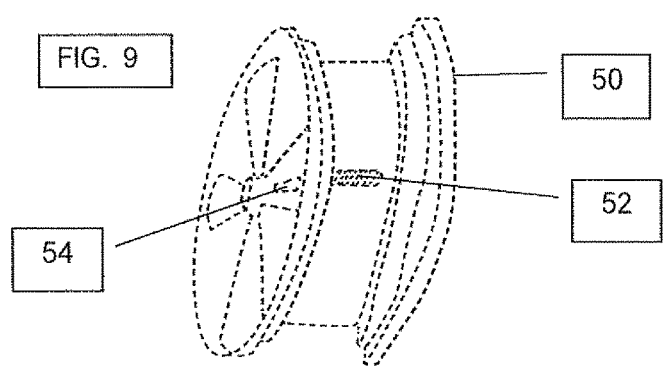

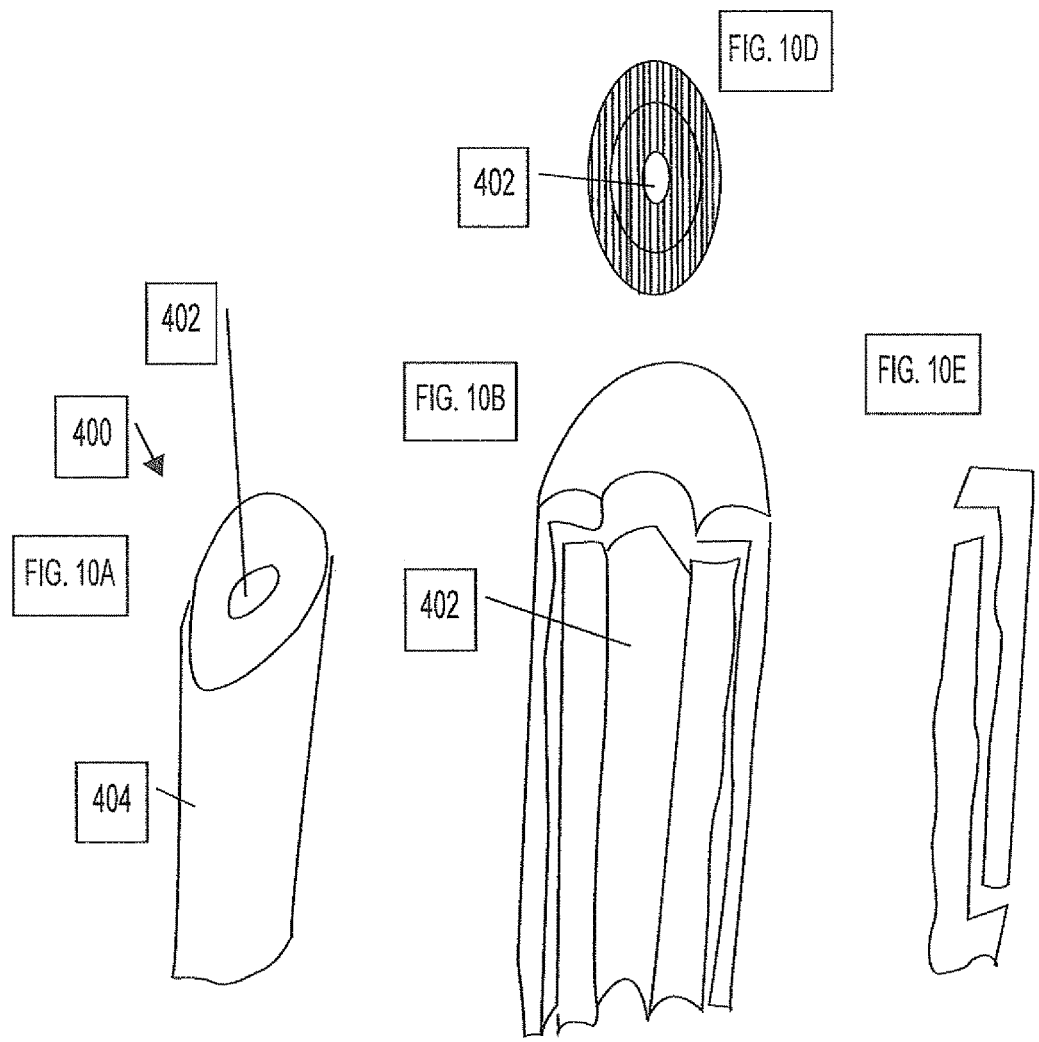

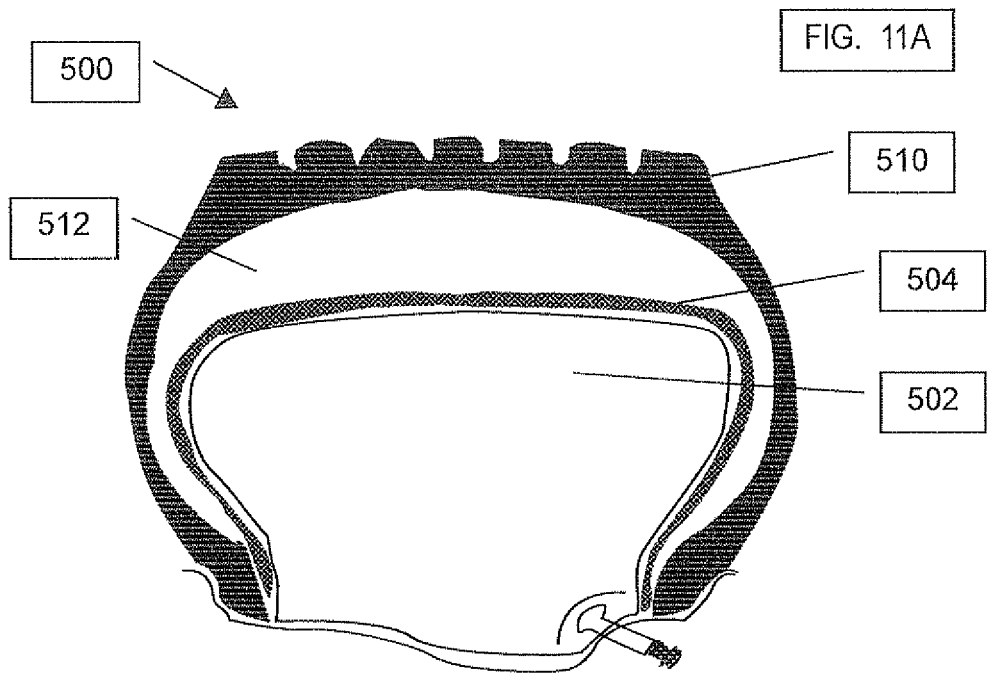
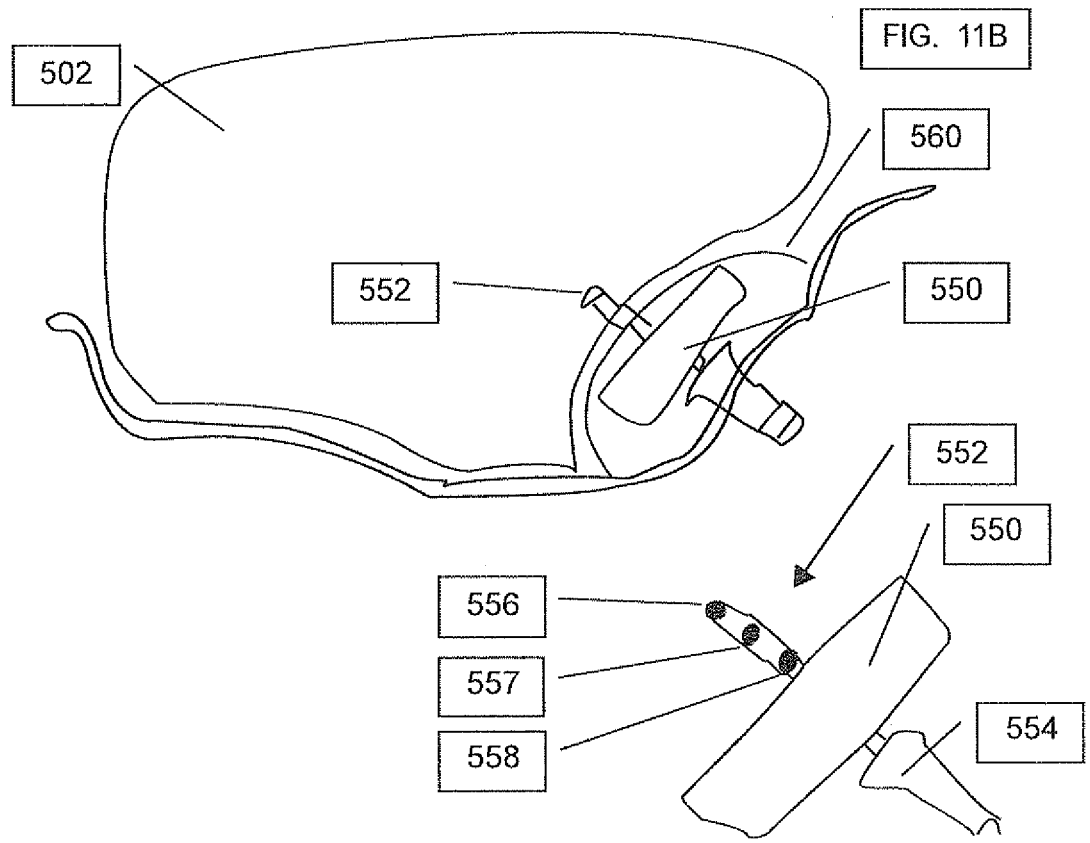

COMPREHENSIVE TIRE PRESSURE MAINTENANCE SYSTEM

FIELD AND BACKGROUND OF THE INVENTION

The present invention relates to tire pressure maintenance systems and, in particular, it concerns five subsystems whose synergy results in a comprehensive tire pressure maintenance system.

Tire Pressure Monitoring Systems (TPMS) are now a required safety feature on all new cars sold in the US. Virtually all TPMS designs in the marketplace involve a sensor that is installed within the interior of the rim and attached to the base of the valve stem. The only way to access the sensor is to remove the tire from the wheel. Removing the tire from the wheel is too difficult a task for the general public. Even the Do-It-Yourself enthusiast would require a highly specialized, expensive tire removal tool to access the sensor.

The ability to access the sensor is important due to an inherent problem in the TPMS designs in the marketplace. Currently, most sensors have internal batteries that are housed and sealed within the sensor unit. These batteries have a limited life, which limits the life of the sensor. When the battery dies, the car owner may be forced, depending on local safety standards, to replace the sensor and have it reinstalled. In lieu of such legislation, the owner may still decide to replace the TPMS unit for reasons of personal safety. This is a significant expense to the car owner, which is triggered by the recurring need to replace a relatively inexpensive battery. The need of the designs currently in use to regularly replace an inexpensive part has converted the otherwise durable monitor sensor to a disposable high-cost item.

Additionally, some commercial and military vehicles have on-board air compressors that re-inflate under-pressured tires. There are also, for consumer applications, self-inflating tires that are specially designed to maintain a constant target tire pressure. As well, the design and introduction of run-flat tires allow a driver to continue driving for a limited distance at a limited speed with a compromised or flat tire that can no longer maintain adequate air pressure.

Self inflating tires (SIT) typically utilize an external delivery system to re-inflate tires. Commercial vehicle and military applications use on-board air compressors that feed air through a hose that delivers air to the tire. Such a configuration is not practical for automobile and light vehicle applications.

A recent innovation in self-inflating tires for automobiles involves the use of a peristaltic pump that is placed between the lip of the tire and the wheel rim. As the wheel rotates it forces air into the tire and is regulated by a pressure sensitive valve. While an elegant solution for automobile and light vehicle applications, this design requires either customized rims or tires that can accommodate or integrate the peristaltic pump.

Run-flat tires are designed to allow a driver to continue driving after a tire has been compromised. Three basic designs are: self-sealing, self-supporting and auxiliary-supported.

A self-sealing tire uses either a special internal liner or a sealant to repair a minor puncture. The effectiveness of this design is limited to preventing or slowing air escaping after incurring a small tire puncture or hole. As well, self-sealing tires often use sealants that can damage tire pressure monitoring sensors, which are now a required feature on all new vehicles.

A self-support tire utilizes a thicker side wall that is designed to support the weight of a car when the tire is deflated. The modified design negatively affects the handling characteristics of the tire. After sustaining a flat, these tires can only be driven for a limited distance at a limited speed. As well, these tires typically have a 20% to 40% weight penalty. Furthermore, driving in a deflated state compromises the tires integrity and they cannot be repaired or reused.

An auxiliary-supported tire has a ring of weight-bearing material that attaches to the interior of the rim and supports the weight of the car when the tire is deflated. This material is taller than the side walls of the rim but not tall enough to touch the inner circumference of a properly inflated tire. This design requires both special tires and often special rims to accommodate the auxiliary support. This design also attracts a significant weight penalty and can only be driven for a limited distance at a limited speed.

As mentioned above, Tire Pressure Monitoring Systems (TPMS) are now a required safety feature on all new cars sold in the US. Virtually all TPMS designs in the marketplace involve a sensor that is installed within the interior of the rim which broadcasts real-time tire pressure data to the car's electronic information network. In some higher end vehicles the tire pressure data is presented graphically via an on-board screen that displays a visual image of each wheel's position and tire pressure. However, in many cars the data displayed is reduced to a single indicator light that signals when one or more of the tires are under-inflated by 25% or more. Although this design satisfies the safety regulations mandated under the TREAD Act, a simple warning light does not convey the actual tire pressure, the number of wheels affected or the wheel position of the under-inflated tire(s). It also fails to signal over-inflation or any under-inflation below the 25% threshold. Consequently, a warning light does not enable the driver to monitor and manage optimal tire pressure, which impacts both safety and fuel efficiency.

Once the warning light goes on, the driver must still use a tire pressure gauge to determine which tires need re-inflating. Even the higher cost systems that display tire pressure and positional information must still rely on a pressure gauge when inflating the tires. Since the displays are built into the car's dashboard they are out of view when the tires are being inflated and so an air pressure gauge must be used to monitor the tire pressure. Typically, portable mechanical gauges and service station air hoses can be 10% to 15% inaccurate.

To address these problems the proposed solution is i) an affordable alternative to identify each tire's pressure and ii) to accurately inflate each tire to optimal inflation by automatically setting the target tire pressure to its recommended inflation level and either iii) a) signaling once the target air pressure is achieved or iii) b) delimiting the air pressure to the recommended target by using an electronically controlled regulator. Furthermore, iv) each wheel's tire pressure can be viewed remotely (outside of the car's cabin) and wirelessly without the need to physically attach anything to the wheel assembly or the need to turn on the car.

There is therefore a need for a TPMS in which the sensor is mounted in the interior region of the tire and the battery is mounted on the exterior of the tire. To augment such a TPMS, there is also a need for a tubular dry cell battery for use with the TPMS of the present invention. There is additionally a need to re-inflate a tire once the air pressure falls outside an ideal target air pressure range. There is further a need to provide a self-inflating run-flat tire. There is also a need for a device for monitoring tire pressure during inflation that utilizes the Tire Pressure Monitoring System (TPMS) associated with the vehicle.

While there is therefore a need for each of the sub-systems as mentioned directly above, the synergy of these systems results in the need for a comprehensive tire pressure maintenance system that incorporates all of the sub-systems of the present invention. It will certainly be appreciated that benefit will be derived from substantially any combination of fewer than all of the sub-systems of the present invention.

SUMMARY OF THE INVENTION

The present invention is a comprehensive tire pressure maintenance system that incorporates five of the sub-systems.

According to the teachings of the present invention there is provided, a comprehensive tire pressure maintenance system for use with motor vehicles, the system comprising: (a) a TPMS with an externally mounted battery; (b) a tubular battery configured for deployment on a valve stem configured to accommodate said deployment of said tubular battery; (c) a self-inflating run-flat tire arrangement; (d) a self-inflating pressure-optimizing tire arrangement; and (e) a wireless tire pressure gauge.

There is also provided according to the teaching of the present invention a TPMS with an externally mounted battery for use with a wheel with a tire mounted thereon, the TPMS comprising: (a) a valve stem configured to accommodate deployment of the externally mounted battery; (b) a battery configured to deployment on said valve stem; and (c) wires that pass through a valve stem base into an interior region defined by a combination of the tire mounted on the wheel so as to provide electric communication between the battery and a TPMS sensor deployed in said interior region.

According to the teachings of the present invention said battery is a tubular battery configured with an axial through bore.

There is also provided according to the teaching of the present invention a tubular battery comprising; (a) an outer casing; and (b) an axial through bore.

According to the teachings of the present invention the tubular battery is configured for deployment on a valve stem configured to accommodate said deployment of said tubular battery.

There is also provided according to the teaching of the present invention a self-inflating run-flat tire arrangement for use with a tire mounted on a wheel of a motor vehicle having a tire pressure sensor system, the self-inflating run-flat tire arrangement comprising: (a) a pressurized air reservoir deployed in an internal volume of the tire; and (b) an inflatable air bladder configured to receive pressurized air from said pressurized air reservoir so as to fill said internal volume and thereby re-inflate the tire.

According to the teachings of the present invention, there is also provided including a regulator for controlling air flow between various components of the self-inflating run-flat tire arrangement.

According to the teachings of the present invention said regulator is configured to control at least one of: (a) air flow from a valve stem to said internal tire volume; (b) air flow from said valve stem to said air reservoir; (c) air flow from said air reservoir to said internal tire volume; (d) air flow from said air reservoir to inflatable air bladder; (e) air flow from said internal tire volume to said valve stem so as to release air; and (f) air flow from said air bladder to said valve stem so as to deflate air bladder.

According to the teachings of the present invention said regulator is configured so as to be remotely controlled.

There is also provided according to the teaching of the present invention an automatic self-inflating pressure-optimizing tire arrangement for use with tire mounted on a wheel of a motor vehicle having a tire pressure sensor system, the self-inflating pressure-optimizing tire arrangement comprising: (a) a pressurized air reservoir deployed in an internal volume of the tire; and (b) a regulator for controlling air flow between said pressurized air reservoir and said internal volume so as to maintain an optimal predetermined tire pressure so as to correct for minor air loss.

There is also provided according to the teaching of the present invention a wireless tire pressure gauge for use with a motor vehicle having a TPMS, the wireless tire pressure gauge comprising: (a) an RF receiver tuned to transmitting units of the vehicle's TPMS; and (b) a display screen configured to display at least one of a target air pressure and an actual air pressure.

According to the teachings of the present invention said RF receiver and said display screen are integrated into a key fob.

According to the teachings of the present invention said RF receiver and said display screen are configured in an electronic tire pressure gauge and regulator combination that physically attaches to a valve stem during tire inflation.

There is also provided according to the teaching of the present invention a method for operating a self-inflating run-flat tire arrangement for use with tire mounted on a wheel of a motor vehicle having a tire pressure sensor system, the method comprising: (a) deploying within a internal volume of the tire: (i) a pressurized air reservoir; (ii) an inflatable air bladder configured to receive pressurized air form said pressurized air reservoir so as to fill said internal volume and thereby re-inflate the tire and maintain an operational tire pressure; (iii) a regulator configured for automatically controlling air flow between various components of the self-inflating run-flat tire arrangement; and (b) upon loss of air pressure within the tire, automatically operating said regulator to control air flow between said air reservoir and said bladder.

There is also provided according to the teaching of the present invention a method for operating a self-inflating pressure-optimizing tire arrangement for use with tire mounted on a wheel of a motor vehicle having a tire pressure sensor system, the method comprising: (a) deploying within a internal volume of the tire: (i) a pressurized air reservoir; and (ii) a regulator configured for automatically controlling air flow between said pressurized air reservoir and said internal volume; and (b) upon loss of air pressure within said internal volume to a level below a predetermined threshold, automatically operating said regulator to control air flow between said air reservoir so as to return the air pressure in said internal volume to within an optimal tire pressure range.

BRIEF DESCRIPTION OF THE DRAWINGS

The invention is herein described, by way of example only, with reference to the accompanying drawings, wherein:

FIG. 1 is an example of a current state of the art TPMS system including the valve stem and cap;

FIG. 2 is a schematic sketch of a valve stem constructed and operational according to the teaching of the present invention, shown here without the battery deployed;

FIG. 3A is a schematic sketch of a first variation of a battery module constructed and operational according to the teaching of the present invention, shown here during deployment;

FIG. 3B is a schematic sketch of the battery module of FIG. 3A, shown here after deployment;

FIG. 4A is a schematic sketch of a second variation of a battery module constructed and operational according to the teaching of the present invention, shown here during deployment;

FIG. 4B is a schematic sketch of the battery module of FIG. 4A, shown here after deployment;

FIG. 7A is a schematic cross-sectional sketch showing details of the battery module of FIG. 6;

FIG. 7B is a schematic top view sketch showing details of the battery connectors configured on the top of the valve stem base of FIG. 6;

FIGS. 8A and 8B are schematic isometric and side view sketches respectively showing details of one possible means of an anti-theft feature for a battery module of the present invention;

FIG. 9 is a schematic isometric view sketch of an alternate embodiment of a TPMS system constructed and operational according to the teaching of the present invention;

FIG. 10A is a generic schematic isometric view sketch of a tubular dry cell battery constructed and operational according to the teaching of the present invention;

FIGS. 10B and 10E are schematic sectional sketches showing variations of the construction of the tubular dry cell battery of FIG. 10A;

FIGS. 10C and 10D are schematic top and bottom views respectively of the tubular dry cell battery of FIG. 10B;

FIG. 11A is a schematic sectional sketch of an automatically inflatable run-flat arrangement, constructed and operational according to the teaching of the present invention, shown mounted inside a tire on a rim;

FIG. 11B is a schematic sectional sketch of a detail of the inflatable run-flat bladder of FIG. 11A;

FIG. 11C is a schematic sketch of a detail of the TPMS of the embodiment of FIG. 11A;

DESCRIPTION OF THE PREFERRED EMBODIMENTS

The present invention is a comprehensive tire pressure maintenance system that incorporates five of the sub-systems.

The principles and operation of a comprehensive tire pressure maintenance system and its sub-systems according to the present invention may be better understood with reference to the drawings and the accompanying description.

By way of introduction, an illustrative example of a valve stem configured for use with an external battery, of the comprehensive tire pressure maintenance system of the present invention is shown in FIGS. 2-8 of the attached drawings. An illustrative example of a TPMS according to an alternative embodiment of the present invention is shown in FIG. 9 of the attached drawings.

An illustrative example of a tubular battery for use with the valve stem of the present invention, of the comprehensive tire pressure maintenance system of the present invention is shown in FIGS. 10A-10E of the attached drawings.

Illustrative examples of a run-flat bladder, a pressurized air reservoir and an air regulator for use with such a bladder and pressurized air reservoir are shown in FIGS. 11A-11c of the attached drawings.

Figure 12:
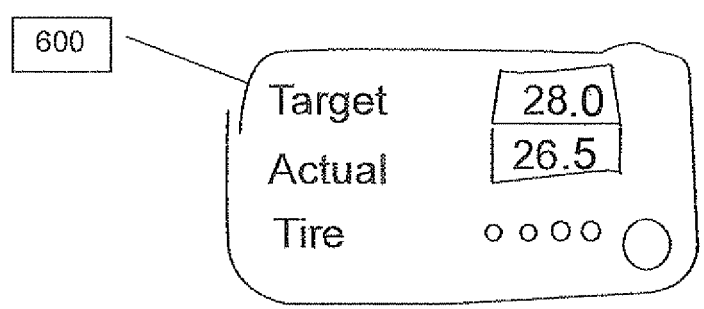
FIG. 12 is a schematic sketch of a first preferred embodiment of a tire inflation monitoring device, illustrated here as a key fob.
Figure 13:
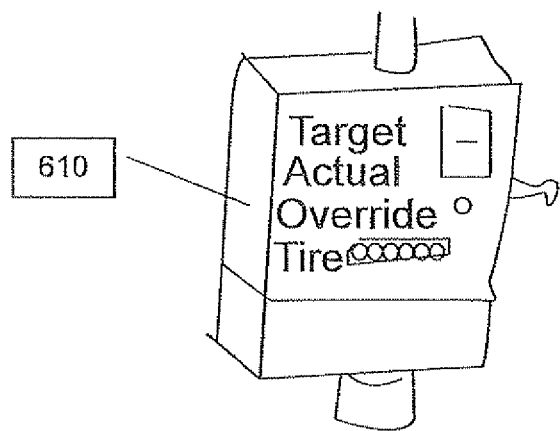
FIG. 13 is a schematic sketch of a second preferred embodiment of a tire inflation monitoring device, illustrated here as a wireless electronic portable tire pressure gauge.

Illustrative examples of tire inflation monitoring devices are shown in FIGS. 12 and 13 of the attached drawings.

The structure and function of these sub-systems and the synergy that results in the comprehensive tire pressure maintenance system of the present invention will be clear from the drawings and accompanying description.

Referring now to the drawings, FIG. 1 illustrates an example of a current state of the art TPMS 2. It includes a sensor body 4 with an internal battery 6, a valve stem 8, and valve core 10 and a valve cap 12. It will be appreciated that since the battery of TPMS 2 is located inside the sensor body which is deployed inside the tire, the tire must be removed in order to change the battery, as discussed above.

The TPMS of the first sub-system of the present invention, includes a modified valve stem 100, as illustrated in FIG. 2, configured with an attachment means for an external battery and wires 110 and 112 that pass through the valve stem base 102 into the interior region defined by the combination of the tire mounted on the wheel so as to provide electric communication from the battery to the TPMS sensor deployed in the interior region.

FIGS. 3A and 3B illustrate a battery module 120 that is flush with the sides of the valve stem base. It will be readily understood that FIG. 3A illustrates the battery module 120 during deployment, while FIG. 3B illustrates the battery module 120 after deployment.

FIG. 4 illustrates a battery module 120' in which the sides of the battery module overlap the valve stem base 102, thereby providing a better watertight seal. It will be readily understood here too, that FIG. 4A illustrates the battery module 120' during deployment, while FIG. 4B illustrates the battery module 120' after deployment.

Figure 5:
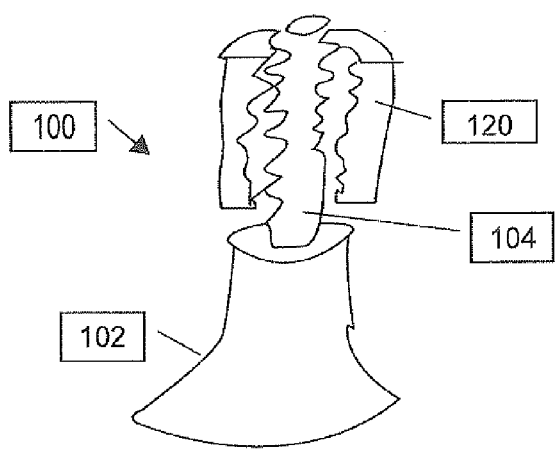
FIG. 5 is a schematic cut-away sketch of a generic battery module illustrating the tubular shape and threads on the inside surface of the tube so as to be threadable on the valve core.

FIG. 5 illustrates a cut-away view of an example of a generic battery module, such as battery module 120 of FIGS. 3A and 3B that is tubular in shape and threaded on the inside surface of the tube so as to by threadable on the valve core 104. It will be readily appreciated that while a tubular battery may be the optimum configuration, substantially any battery configuration that allows the battery to be deployed on, or around, the valve stem or other readily accessible location (see FIG. 9) is within the scope of the present invention. Further, even with a tubular battery module, the battery itself need not encompass the full 360°. That is to say, a tubular battery module according to the teachings of the present invention may be configured with one or more battery compartments designed to hold common batteries of a standard size. Alternatively, a tubular battery module according to the teachings of the present invention may be configured to hold a semi-tubular shaped battery, whose contour covers a arc of less than 360°.

Figure 6:
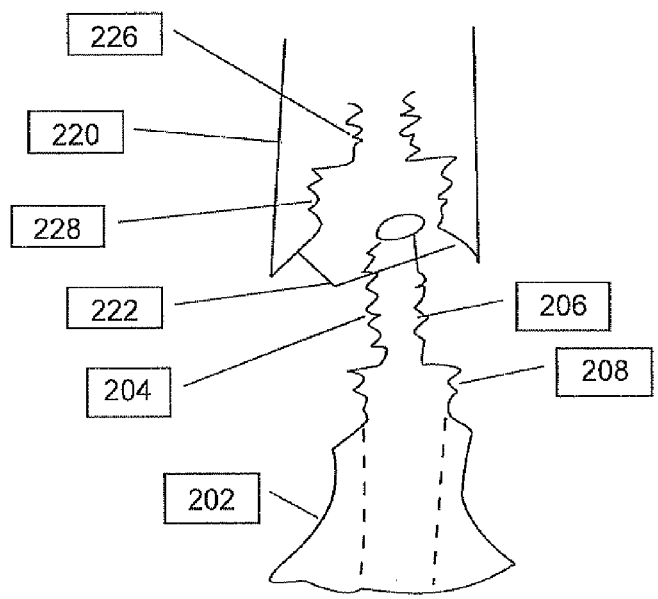
FIG. 6 is a schematic cross-sectional sketch of further variations of a battery module, according to the teaching of the present invention.

FIG. 6 illustrates a variation of the TPMS of the present invention in which the bottom 222 of the battery module 220 overlaps the valve stem base 202. It also illustrates stepped regions 206 and 208 of the base 202 and 226 and 228 of the battery module 220 that may be threaded for interconnection of the battery module 220 and the valve stem base 202. It should be noted that any one or both of stepped regions 206 and 208 of the base 202 and 226 and 228 of the battery module 220 as illustrated may be configured with threads in a single finished unit.

FIG. 7A illustrates a fully incased battery module 320 showing one possible means for providing electrical connection between the battery module and the valve stem base. As shown here, tangs 330 and 332 (which correspond to the positive and negative battery contacts) extend from the bottom of the battery module 320. As illustrated in FIG. 7B, corresponding concentric contact rings 330' and 332' are configured on the top of the valve stem base, which are in turn connected to power lead wires such as those illustrated as elements 110 and 112 in FIG. 2.

FIGS. 8A and 8B illustrate one possible means for providing an anti-theft feature of the battery module of the present invention. It will be appreciated that as the battery module is threaded onto the valve stem, tangs (such as those illustrated above as 330 and 332) will pass over the anti-reversing notches 140. Once the battery module is fully threaded on the valve stem base 102, the tangs will rest on electrical contacts 142, thereby making contact with the wires passing through to the interior of the tire.

As described above, the TPMS sub-system of the present invention includes a battery having an innovative shape such that it is integrated into the neck of the valve stem, which is exterior to the rim. The exterior surfaces of both the battery and the valve stem may be configured with a protective, insulated coating. The valve stem has wiring that is fully integrated into the protective, insulated coating. These wires will extend from the positive and negative terminals of the battery to the bottom of the base of the valve stem, which is internal to the rim. The TPMS is, therefore, positioned internally in the rim and will attach to the base of the valve stem in such a way that the valve stem wiring provides electrical communication between the interior mounted sensor to the exterior battery.

The exterior battery is fully integrated into the valve stem, fully accessible, removable and replaceable. A simple twisting motion will remove the battery, which is threaded onto the valve stem.

A replacement battery can likewise be threaded by hand on the valve stem and click-locked into place when the battery terminals are properly aligned with the valve stem wiring.

The contact terminals on the battery may be designed to break away when the battery is removed. These terminals lock into place when the battery is installed and break away to release the battery for removal/replacement. This design feature is intended to make the battery inoperable once it is removed. The purpose of this feature is to deter small parts theft. Once removed, the battery will no longer function.

Further variations of the TPMS of the present invention may include the following:

1. Be fully encased. The housing could line the exterior side surface, top and bottom of the battery. The internal wall surface may or may not be directly coated. The inner walls could rely on the seals on the top and the bottom ends of the battery for protection from the elements.

2. Non-removable housing. With such a design the replacement part is only the battery. The replacement battery will fit into a reusable encasement.

3. The encased unit will thread onto the value stem. Instead of threading along the length of the valve stem, the unit will attach at its end point (top or bottom) to the valve stem. Either the encasement or the battery itself will attach to the valve stem.

4. The length of the battery and/or the encasement unit will vary depending on the length of the valve stem. If the battery varies in size, it could either maintain a constant width but provide greater milliamp hours or the battery profile could be made thinner as it gets longer. This would allow the overall unit to have a thinner width. Consequently, the valve stem could be made thinner for longer length valve stems.

5. The power unit is designed to have a built-in anti-theft mechanism. The power unit could be designed without concern for theft. In such a case, the power unit—neither the battery nor the housing unit—will not suffer damage when it is removed.

6. The contact points on the unit are deigned to break apart when the unit or battery are removed. If the design uses a non-removable housing, then the breakaway contacts are an integral part of the housing unit. If the battery utilizes a removable housing design, then the contacts are an integral part of the battery.

7. The battery contact points and/or the contact tabs that are built into the valve stem base unit can be located on the bottom, top or side wall of the battery.

FIG. 9 illustrates a second alternative of the TPMS of the present invention in which the sensor unit 52 is mounted directly on the interior region of wheel 50 with the batteries deployed in a receptacle 54 accessible from the exterior of the wheel. It will be appreciated that receptacle 54 may include a cover that renders it unnoticeable to the casual onlooker.

Regarding the second sub-system of the present invention, the tubular dry cell battery 400, as illustrated herein in FIGS. 10A-10E, the truly distinguishing feature of the tubular dry cell battery 400 is the axial through bore 402, which allows for deployment of the battery over the valve stem of the present invention. It will be appreciated that while the battery 400 is illustrated herein as a cylinder and referred to a "tubular", these are intended as examples only. It should be understood that the outer contour of the battery case may be configured with substantially any suitable contour such as, but not limited to, square, rectangular and oblong.

It will be readily understood by one of skill in the art that positive and negative contacts may be configured substantially anywhere on the battery's surface according to the design requirements of a particular application.

Some variations may include:
- The surface of the through bore 402 may be configured as a first contact (positive for example) and the outer surface 404 of the battery may be configured as a second contact (negative for example), such as illustrated in FIG. 10A.
- Both contacts may be configured at one end of the battery as concentric circles, such as illustrated in FIGS. 10B-10C.
- Each end of the battery may be configured as a contact, such as illustrated in FIG. 10E.

While the applications in which the tubular battery of the present invention may be used to benefit are numerous, it will be readily appreciated that such a tubular battery has a direct application for use with a TPMS with an external battery. In such an application, the shape of the battery is a hollow cylinder that fits as a collar around the valve stem.

The valve stem has integrated positive/negative contact terminals where it interfaces with the battery.

The third sub-system of the present invention relates to a self-inflating run-flat tire arrangement 500, as illustrated in FIGS. 11A-11C, that combines a self-inflating tire with run-flat features. The self-inflating run-flat tire of the present invention does not require specially designed tires or proprietary rims and can be retrofit on most standard tire and rim combinations, nor does it require the use of an on-board air compressor.

The basic design involves deployment of a pressurized air reservoir 502 in the internal volume of the tire 510. The reservoir 502 is configured to store pressurized air that, upon occurrence of a sudden loss of tire pressure such as, but not limited to, a puncture, can be released into an inflatable air bladder 504 that fills the tire cavity to re-inflate a tire and may attempt to maintain an operational, or possibly optimal, tire pressure. The reservoir may be constructed from material similar to a tire "inner tube" that is encased in a protective fabric. It will be appreciated that the protective fabric may be configured to contain the reservoir with a specific contour. Alternatively, reservoir 502 may be constructed of a solid, or non-elastic, material, such as, but not limited to, a canister or annular shaped container. The tire pressure of the ambient tire cavity 512, the air reservoir 502 and the inflatable air bladder 504 are monitored by pressure sensors connected to the TMPS device 550 and controlled by an electronic regulator 552.

The non-inflated air bladder 504 covers the top, and sides of the air reservoir 502. The material design of the bladder will also be similar to a tire inner tube. Regulator 552 controls fluid communication (air flow) between the bladder 504 and the air reservoir 502. A critically low air pressure or a rapid reduction in the ambient air pressure of the internal tire chamber 512 will trigger the regulator 552 to release air from air reservoir 502 into the bladder 504. The air filled bladder will effectively become an inner tube that inflates to support the flat tire allowing the driver to continue unimpeded in the run-flat mode. The damaged tire has effectively been converted from a compromised tubeless tire to a fully inflated tire with an inner tube configuration.

Additionally, in cases of chronic minor air loss due to permeation, air may be automatically released from pressurized air reservoir 502 into the internal volume of the tire 510 when the tire pressure falls to a level below a predetermined threshold, so as to return the air pressure in the tire to within an optimal tire pressure range. It will be appreciated that while current state of the art TPMS systems provide a warning when the tire pressure falls below a predetermined threshold, it is unique to the present invention to automatically correct the problem by adding the required amount of air to increase the pressure back to an optimal tire pressure. It will be further appreciated such a feature would be of benefit separate from the run-flat features of the present invention and therefore can be considered as a fourth sub-system of the present invention.

Therefore, the electronic regulator 552 controls the flow of air from: a) valve stem 554 to the ambient internal tire chamber 512 via aperture 558; b) valve stem to the air reservoir 502 via aperture 556; c) air reservoir 502 to the ambient internal tire chamber 512 via apertures 556 and 558; d) air reservoir 502 to the bladder 504 via apertures 556 and 557; e) the bladder 504 out through the valve stem via aperture 557; and f) the air reservoir 502 and the valve stem 554 in order to deflate the air reservoir 502 when changing the tire. The regulator also controls the valve stem to release air if the ambient tire pressure exceeds a critical value. This is to prevent over-inflation due to reservoir leakage. It will be appreciated that electronic regulator 552 may be configured to control the above operations automatically, manually, on command such as, but not limited to radio communication from the key fob, either individually or a combination thereof.

The main unit of TPMS monitor 550 is surrounded by a physical barrier 560. Barrier 560, serves to segregate and protect the main unit of TPMS monitor 550 from the bladder 504 when inflated, while at the same time protect bladder 504 from the main unit of TPMS monitor 550.

While the TPMS is intended to monitor the tire pressure in the interior volume of the tire, at times it is advantageous to additionally monitor the air pressure in either one or both of the air reservoir 502 and the bladder 504 depending on the overall configuration of the comprehensive tire pressure maintenance system of the present invention. That is to say, if the system is configured only for self-inflating pressure-optimizing, then it would be advantageous to monitor the pressure within the air reservoir 502. Likewise, if the system is configured for both self-inflating pressure-optimizing and self-inflating run-flat, then it would be advantageous to monitor the pressure within the air reservoir 502 as well as the pressure within the bladder 504.

Illustrative examples of a fifth sub-system of the present invention, a tire inflation monitoring device is shown in FIGS. 13 and 14 of the attached drawings.

FIG. 12 illustrates a wireless tire pressure gauge 600 that is integrated into the vehicle's key fob. The gauge displays the actual tire pressure of each tire as well as the recommended target tire pressure. The gauge 600 utilizes the tire pressure information that is measured by the Tire Pressure Monitoring Sensor (TPMS) which is attached to the interior wall of each wheel's rim. When inflating a tire, the wireless tire pressure gauge 600 will, for example, emit a series of beeps when the target tire pressure is achieved. Alternatively, the vehicle itself may emit a series of beeps when signaled by the TPMS.

The gauge may be configured to automatically display the recommended target tire pressure, eliminating the need to know or input this number. There is no need to physically attach the gauge to the wheel assembly since it wirelessly reads the tire pressure information. There is also no risk of over or under-inflating since the gauge signals when each tire is properly inflated. Additionally, or optionally, the gauge may be configured to remotely control the electronic regulator 552 so as to control into which compartment within the tire, such as the flow of air from the valve stem 554 to the ambient internal tire chamber 512 via aperture 558, from the valve stem 554 to the air reservoir 502 via aperture 556, or from the bladder 504 to the valve stem 554 in order to release pressure, such as when emptying the bladder after use, for example.

It will be appreciated that that the system of the present invention allows for "on demand" tire pressure adjustment. Unlike the current TPMS systems that are directed solely to warn the driver of low tire pressure, the system of the present invention allows the driver to accurately adjust the tire pressure to a predetermined pressure using the existing TPMS system, even if the predetermined pressure is outside of the "normal" range of the TPMS system.

The wireless tire pressure gauge of the present invention has improved accuracy. It displays the tire pressure that is measured by the TPMS, which is more reliable than the typical service station air hose or portable air pressure gauge.

Further, the wireless gauge is not a fix position display that is built into the dashboard. Since the display is integrated into the key fob, it is highly portable and can be read in situ, while inflating each tire.

The basic features of the wireless tire pressure gauge 600 may include, but are not limited to:
1. Utilizing an RF receiver that is tuned to the vehicle's TPMS transmitting units.
2. Being fully integrated into the key fob.
3. A small screen that displays both the target and the actual air pressure. This is data that is already part of the TPMS broadcast stream.
4. An indicator such as, but not limited to, a series of four LEDs, to indicate the wheel of the vehicle for which the information is being displayed.
5. Having an on/off/tire select button that activates the unit and cycles through the four tires.
6. Having a program mode button that will allow users to:
    a) input a customized target air pressure; and/or b) reprogram the wheel positions.

Variant and/or additional features of this embodiment may include the following:
1. Electronically determine and reprogram the tire locations. Current systems that reprogram the tire position after a wheel location is altered include the use of i) two-way radio frequency communication, ii) a magnetic reset tool, or iii) a sequence of releasing air from each tire. The proposed design could detect and reprogram the wheel position into the key fob by pairing the tires to the appropriate target LED light once the programming mode has been activated. With such a design, the four LED lights are arranged as four corners of a rectangle such that each light corresponds to a specific wheel position and not a specific wheel.
2. Linking the four LEDs to the four valve stem assemblies. Each valve stem will have a mark or color that identifies it. Each LED will reference a specific wheel such as, but not limited to, either by color coding (the red LED represents the red valve stem, for example) or numerically (the second LED in a row of 4 represents the valve stem with the number "2" on it, for example).
3. Utilize an electronic regulator that is designed to cut off air flow once the target tire pressure is achieved.

FIG. 13 illustrates an electronic tire pressure gauge and regulator combination 610 that physically attaches to the valve stem during tire inflation. This unit may be configured to work in conjunction with the key fob gauge 600 or alternatively/optionally it may be configured as an independent unit that integrates a regulator with an RF receiver (wireless gauge) that is tuned to the vehicle's TPMS transmitting units. The unit has the same display features and functionality as the key fob 600 version. As well as the ability to remotely control the electronic regulator 552 as described above. It also includes a standard valve stem aperture that will interface with an air supply hose, a release valve that can deflate a tire, and an over-ride button that by-passes the regulator so that the tire pressure can be dialed in to allow unrestricted customized tire pressure.

In one variant embodiment, the electronic tire pressure regulator 610 displays the information of the nearest, most proximal wheel.

The unit is limited to displaying the data that is broadcasted from the most proximal wheel. The tire pressure of each specific wheel is read by moving the unit close to the target tire. This design eliminates the need to identify or display the tire position of the reference wheel.

Alternatively or optionally, the wireless unit (key fob 600 or regulator 610 version) may be tunable to all frequencies within the TPMS bandwidth spectrum. This feature will allow the unit to receive transmitted information from any TPMS unit within range. It will automatically display the data from the most proximal TPMS unit, i.e. from the closest wheel.

Presently, systems commonly now in use can handle only one set of tires/wheels associated with the vehicle. The system of the present invention can be configured to accommodate any number of sets of tires/wheels being associated with the vehicle, thereby easing the transition from summer to winter tires, or on-road to off-road tires, as non-limiting examples.

It will be appreciated that the above descriptions are intended only to serve as examples and that many other embodiments are possible within the spirit and the scope of the present invention.

What is claimed is:

1. A Tire Pressure Maintenance System (TPMS) with an externally mounted battery for use with a wheel with a tire mounted thereon, the TPMS comprising:
    (a) a valve stem configured to accommodate deployment of an externally mounted tubular battery;
    (b) a tubular battery having an axial through bore, said tubular battery having a mechanical engagement arrangement configured for releaseable attachment of said tubular battery to said valve stem when said tubular battery is deployed on said valve stem with at least a portion of said valve stem deployed within said axial through bore; and
    (c) wires that pass through a valve stem base into an interior region defined by a combination of the tire mounted on the wheel so as to provide electric communication between said tubular battery and a TPMS sensor deployed in said interior region.

2. A tubular battery for mounting on a valve stem, the tubular battery comprising;
    (a) an outer casing;
    (b) an axial through bore, configured to receive at least a portion of the valve stem therein; and
    (c) a mechanical engagement arrangement configured for releasable attachment of said tubular battery to the valve stem when said tubular battery is deployed on said valve stem with at least a portion of said valve stem deployed within said axial through bore.

* * * * *